United States Patent
Hirakawa et al.

(10) Patent No.: US 12,172,208 B2
(45) Date of Patent: Dec. 24, 2024

(54) OPERATION METHOD OF LADLE REFINING TREATMENT

(71) Applicant: JFE STEEL CORPORATION, Tokyo (JP)

(72) Inventors: Kazuaki Hirakawa, Tokyo (JP); Koichiro Hirata, Tokyo (JP); Isao Shimoda, Tokyo (JP); Takashi Yamauchi, Tokyo (JP); Hirohide Uehara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 312 days.

(21) Appl. No.: 17/756,478

(22) PCT Filed: Oct. 21, 2020

(86) PCT No.: PCT/JP2020/039613
§ 371 (c)(1),
(2) Date: May 26, 2022

(87) PCT Pub. No.: WO2021/106441
PCT Pub. Date: Jun. 3, 2021

(65) Prior Publication Data
US 2023/0012857 A1 Jan. 19, 2023

(30) Foreign Application Priority Data

Nov. 29, 2019 (JP) ................. 2019-217402

(51) Int. Cl.
*B22D 2/00* (2006.01)
*B22D 1/00* (2006.01)
*C21C 7/00* (2006.01)
*C21C 7/04* (2006.01)

(52) U.S. Cl.
CPC ............. *B22D 2/006* (2013.01); *B22D 1/00* (2013.01); *C21C 7/00* (2013.01)

(58) Field of Classification Search
CPC .. B22D 1/00; B22D 2/00; B22D 2/006; C21C 7/00; C21C 7/04
USPC ........................ 164/55.1, 56.1, 57.1; 148/511
See application file for complete search history.

(56) References Cited

U.S. PATENT DOCUMENTS

| 6,302,941 B1 | 10/2001 | Oya et al. |
| 2018/0080715 A1 | 3/2018 | Neyens et al. |

FOREIGN PATENT DOCUMENTS

| CN | 1603026 A | 4/2005 |
| CN | 103382515 A | 11/2013 |
| CN | 104451037 A | 3/2015 |
| CN | 106191380 A | 12/2016 |
| JP | S56162394 A | 12/1981 |
| JP | S61195914 A | 8/1986 |
| JP | S63203716 A | 8/1988 |
| JP | H01209328 A | 8/1989 |
| JP | H08319507 A | 12/1996 |
| JP | H11124618 A | 5/1999 |
| JP | H11293331 A | 10/1999 |
| JP | 2009041069 A | 2/2009 |
| JP | 2010217164 A | 9/2010 |
| JP | 2010243171 A | 10/2010 |
| JP | 2017186601 A | 10/2017 |
| JP | 2018104805 A | 7/2018 |

OTHER PUBLICATIONS

Machine translation of JP 2010-217164 A (Year: 2010).*
Sep. 19, 2023, Office Action issued by the Korean Intellectual Property Office in the corresponding Korean Patent Application No. 10-2022-7019965 with English language concise statement of relevance.
Dec. 8, 2022, the Extended European Search Report issued by the European Patent Office in the corresponding European Patent Application No. 20894340.7.
Dec. 1, 2020, International Search Report issued in the International Patent Application No. PCT/JP2020/039613.
Nov. 30, 2021, Notification of Reasons for Refusal issued by the Japan Patent Office in the corresponding Japanese Patent Application No. 2021-523322 with English language Concise Statement of Relevance.
Feb. 25, 2023, Office Action issued by the China National Intellectual Property Administration in the corresponding Chinese Patent Application No. 202080081770.7 with English language search report.

* cited by examiner

*Primary Examiner* — Kevin P Kerns
(74) *Attorney, Agent, or Firm* — KENJA IP LAW PC (57) ABSTRACT

An operation method of ladle refining treatment by which ladle refining treatment of a molten steel is performed while continuously measuring a molten steel temperature during operation of the ladle refining treatment of the molten steel is provided. The operation method includes setting a time earlier than a scheduled ending time of the ladle refining treatment in a continuous measurement period of the molten steel temperature as a determination timing, and estimating the molten steel temperature at the scheduled ending time on the basis of a change with time of the molten steel temperature in continuous measured data of the molten steel temperature from a start of continuous measurement of the molten steel temperature to the determination timing.

9 Claims, 5 Drawing Sheets

OPERATION METHOD OF LADLE REFINING TREATMENT

TECHNICAL FIELD

The present disclosure relates to an operation method of ladle refining treatment by which a molten steel is received in a ladle and subjected to finish refining such as degassing, decarburization, deoxidation, desulfurization, inclusion morphological control, or composition adjustment (alloying addition) in the ladle.

BACKGROUND

In ladle refining treatment of a molten steel, for example in degassing treatment such as RH degassing treatment, DH vacuum degassing treatment, REDA vacuum degassing treatment, or vacuum degassing treatment in a VOD device, by accurately grasping changes in the molten steel temperature during the treatment and enhancing an accuracy of estimating a finish temperature of the treatment, it is possible to prevent, for example, performing excessive heating or cooling during the degassing treatment, an increase in degassing treatment time due to such heating or cooling, and deceleration caused by an increase in $\Delta T$ (the degree of superheat of the molten steel) in continuous casting following the degassing treatment. This contributes to improved productivity and reduced costs in steelmaking.

To accurately grasp changes in the molten steel temperature, attempts have been made to introduce continuous temperature measurement in steelmaking. For example, JP S63-203716 A (PTL 1) and JP H11-124618 A (PTL 2) each disclose a method of continuously measuring the molten steel temperature using optical fibers or the like and controlling the molten steel temperature during refining. JP 2010-217164 A (PTL 3) discloses a method of continuously calculating the difference between the molten steel temperature and the target temperature at the end of secondary refining and adjusting the amount of oxygen supplied to the molten steel on the basis of the calculated temperature difference and heating efficiency held as a database to control the molten steel temperature at the end of secondary refining to be the target value.

CITATION LIST

Patent Literature

PTL 1: JP S63-203716 A (page 2)
PTL 2: JP H11-124618 A (paragraphs [0028] and [0029])
PTL 3: JP 2010-217164 A (paragraph [0042])

SUMMARY

Technical Problem

However, these methods determine the need for heating or cooling on the basis of the difference between the measured molten steel temperature and the target temperature at the end of the treatment, and do not necessarily ensure that the molten steel temperature at the end of the treatment is within the target range. Moreover, as a result of performing heating or cooling during refining, the adjustment of the molten steel temperature may be required. Depending on the timing of heating or cooling, the treatment cannot be completed within the scheduled time, and the extension of the treatment time is likely to lead to production loss. Such treatment time is not addressed by the foregoing methods, and operation for completing the treatment within the scheduled time is needed.

It could therefore be helpful to provide a method of, in ladle refining treatment of a molten steel, accurately estimating the molten steel temperature after the ladle refining treatment and further a method of controlling the temperature after the treatment to be within a target range using the estimated value without extending scheduled treatment time.

Solution to Problem

To solve the problem stated above, we provide:

(1) An operation method of ladle refining treatment by which ladle refining treatment of a molten steel is performed while continuously measuring a molten steel temperature during operation of the ladle refining treatment of the molten steel, the operation method comprising setting a time earlier than a scheduled ending time of the ladle refining treatment in a continuous measurement period of the molten steel temperature as a determination timing, and estimating the molten steel temperature at the scheduled ending time on the basis of a change with time of the molten steel temperature in continuous measured data of the molten steel temperature from a start of continuous measurement of the molten steel temperature to the determination timing.

(2) The operation method of ladle refining treatment according to (1), wherein the continuous measured data of the molten steel temperature is of measured values corrected depending on an immersion depth of a temperature sensor for continuous temperature measurement.

(3) The operation method of ladle refining treatment according to (1) or (2), wherein in a case where an estimated value of the molten steel temperature is within a target range of the molten steel temperature at the scheduled ending time, operation conditions at the determination timing are maintained until the scheduled ending time.

(4) The operation method of ladle refining treatment according to (1) or (2), wherein in a case where an estimated value of the molten steel temperature is higher than a target range of the molten steel temperature at the scheduled ending time, an operation of decreasing the molten steel temperature is performed in a period from the determination timing to the scheduled ending time.

(5) The operation method of ladle refining treatment according to (1) or (2), wherein in a case where an estimated value of the molten steel temperature is lower than a target range of the molten steel temperature at the scheduled ending time, an operation of increasing the molten steel temperature is performed in a period from the determination timing to the scheduled ending time.

(6) The operation method of ladle refining treatment according to any of (1) to (5), wherein the determination timing is 3 minutes to 8 minutes before the scheduled ending time.

(7) The operation method of ladle refining treatment according to any of (1) to (6), wherein an estimated value $T_f$ of the molten steel temperature is calculated according to the following Formula (1):

$$T_f = BMA_{td} + (BMA_{td} - BMA_{td-\alpha})/\alpha \times t_r \qquad (1)$$

where $T_f$ is the estimated value in °C. of the molten steel temperature at the scheduled ending time, $BMA_{td}$ is a backward moving average value in °C. of a continuous temperature measured value at time $t_d$, $BMA_{td-\alpha}$ is a backward moving average value in °C. of a continuous temperature measured value at time $(t_d-\alpha)$, $t_d$ is an operation time in minutes from the start of the continuous measurement of the molten steel temperature to the determination timing, $t_d-\alpha$ is an operation time in minutes from the start of the continuous measurement of the molten steel temperature to a minutes before $t_d$, and $t_r$ is a time in minutes from obtainment of the estimated value of the molten steel temperature at the scheduled ending time to the scheduled ending time.

(8) The operation method of ladle refining treatment according to (7), wherein $\alpha$ is 0.5 minutes to 2.0 minutes.

(9) The operation method of ladle refining treatment according to (7) or (8), wherein a range of backward moving average is determined on the basis of a variation cycle of a continuous measured value of the molten steel temperature measured beforehand.

(10) The operation method of ladle refining treatment according to any of (2) to (9), wherein the immersion depth of the temperature sensor for continuous temperature measurement is increased with an increase of the number of uses of a measuring element of the temperature sensor for continuous temperature measurement.

(11) The operation method of ladle refining treatment according to any of (1) to (10), wherein the molten steel temperature at the scheduled ending time is estimated on the basis of the change with time of the molten steel temperature in the continuous measured data of the molten steel temperature during killing treatment from after end of at least one of alloying addition and oxygen supply to the determination timing in the continuous measurement period of the molten steel temperature.

(12) The operation method of ladle refining treatment according to any of (1) to (11), wherein the ladle refining treatment is RH degassing treatment.

Advantageous Effect

It is thus possible to, in ladle refining treatment, accurately estimate the molten steel temperature at the end of the treatment. By using the estimated value of the molten steel temperature, the need for heating or cooling in the ladle refining treatment is appropriately determined and, when necessary, heating or cooling can be performed without extending the scheduled treatment time. Such operation also has the effect of stabilizing the molten steel temperature after the ladle refining treatment and thus enabling the subsequent continuous casting process to be performed without productivity loss. Furthermore, when continuously measuring the molten steel temperature (continuous temperature measurement) during the operation of the ladle refining treatment, the life of a measuring element (a refractory-coated temperature measuring element to be immersed in molten steel, hereafter also referred to as "probe") of a temperature sensor for continuous temperature measurement can be improved while maintaining the accuracy of the measured value. Consequently, the increase in the operation costs caused by continuous temperature measurement can be minimized.

BRIEF DESCRIPTION OF THE DRAWINGS

In the accompanying drawings.

DETAILED DESCRIPTION

A molten steel obtained by refining in a converter or an electric heating furnace is tapped into a ladle, the ladle containing the molten steel is transported to a ladle refining device, and the molten steel in the ladle is subjected to ladle refining treatment. For example, the ladle refining device is a vacuum degassing equipment such as a RH vacuum degassing device, a DH vacuum degassing device, or a VOD device, and the molten steel in the ladle is subjected to degassing refining in the vacuum degassing equipment. In the degassing refining, decarburization refining under high vacuum, refining for removing gas components in the molten steel such as hydrogen and nitrogen, and the like are performed. Examples of ladle refining treatments other than degassing refining include desulfurization refining performed by supplying a desulfurizing agent, nonmetallic inclusion removal refining using stirring power, and refining for composition adjustment.

In the case where degassing refining treatment is a process immediately preceding continuous casting, it is necessary to determine, during the degassing refining treatment, the molten steel temperature at the end of the degassing refining by the following procedure, finish the molten steel at the determined temperature, and end the degassing refining, in order to cause the degree of superheat of the molten steel in a tundish in the next continuous casting process to be a predetermined value. The molten steel after the end of the degassing refining is transported to the next continuous casting process.

This embodiment describes, as an example of ladle refining treatment, degassing refining treatment using a RH degassing treatment device. The RH degassing treatment device includes a cylindrical vacuum vessel and a pair of cylindrical snorkels extending from the vessel bottom of the vacuum vessel.

In the degassing treatment using the RH degassing treatment device having such structure, the vacuum vessel is lowered and the snorkels are immersed in the molten steel contained in the ladle. The inside of the vacuum vessel is then reduced in pressure to suck up the molten steel to a predetermined height in the vacuum vessel. By further blowing in gas such as Ar or $N_2$ from the inner surface of one of the snorkels, the molten steel rises in the snorkel on the side where the gas is blown in and falls in the other snorkel, so that the molten steel is circulated to cause the degassing treatment to progress. Thus, in the RH degassing treatment device, the molten steel circulates while passing through the inside of the vacuum vessel, as a result of which gas components, impurities, and the like in the molten steel float and are removed. Moreover, by blowing oxygen gas into the molten steel in the vacuum vessel from a lance or the like, the molten steel is subjected to oxidizing refining such as decarburization, or subjected to heating through use of oxidative heat generation of Al charged into the molten steel. Further, by adding a ferroalloy and auxiliary material to the molten steel in the vacuum vessel from an auxiliary material charge chute in a state in which the molten steel circulates, for example, the compositions of the molten steel are adjusted.

Typically, RH degassing treatment is performed in the following manner:

For example, in RH degassing treatment involving decarburization refining of molten steel, molten steel obtained by refining in a converter or an electric heating furnace is tapped into a ladle in an undeoxidized state, the ladle is transported to a RH degassing equipment, and the molten steel in the ladle is subjected to degassing refining. In an initial stage of the RH degassing treatment, decarburization of causing carbon in the molten steel to react with dissolved oxygen at reduced pressure is performed. During this, oxygen gas is optionally supplied from a lance to increase the dissolved oxygen and facilitate the decarburization. Such treatment that is performed with molten steel in an undeoxidized state is called "rimming treatment".

After the carbon concentration in the molten steel decreases to a target concentration, deoxidizing material such as Al is added to deoxidize the molten steel. After this, a ferroalloy is added to adjust the compositions so as to achieve a target chemical composition, and the RH degassing treatment is continued for a predetermined time to homogenize the component concentration in the molten steel and facilitate floatation separation of the deoxidation products. Such treatment after deoxidation is called "killing treatment".

In RH degassing treatment not involving decarburization refining of molten steel, after deoxidizing molten steel in a ladle when tapping the molten steel from a converter or an electric heating furnace, the ladle is transported to a RH degassing equipment. In this case, in the RH degassing equipment, killing treatment is performed, that is, a ferroalloy is added to adjust the compositions so as to achieve a target chemical composition and the treatment is continued for a predetermined time.

In the foregoing RH degassing treatment, the molten steel temperature decreases with the progress of the killing treatment (unless heating operation is performed). It is necessary to appropriately estimate this temperature decrease amount and accurately adjust the molten steel temperature after the RH degassing treatment to a target temperature. There is thus a need to accurately grasp the temperature changes during the RH degassing treatment and improve the temperature decrease amount estimation accuracy and, in the case where the molten steel temperature after the treatment is expected to be not within a target range, promptly perform an operation of correction to complete the treatment without extending the scheduled time.

The same also applies to ladle refining treatment other than RH degassing treatment. In detail, in all kinds of ladle refining treatment including degassing treatment such as DH vacuum degassing treatment, REDA vacuum degassing treatment, and vacuum degassing treatment in a VOD equipment, gas bubbling treatment, powder injection treatment in the atmosphere or at reduced pressure, wire addition treatment, and ladle refining treatment (i.e. treatment in a ladle furnace) involving arc heating, the molten steel temperature inevitably decreases as a result of the treatment unless an operation of increasing the molten steel temperature is performed. There is thus a need to accurately grasp the temperature changes during the treatment and improve the temperature decrease amount estimation accuracy and, in the case where the molten steel temperature after the treatment is expected to be not within a target range, promptly perform an operation of correction to complete the treatment without extending the scheduled time.

To solve the operational problem in ladle refining treatment such as RH degassing treatment, it could be helpful to provide a method of accurately estimating the molten steel temperature after the treatment and further a method of controlling the temperature after the treatment to be within a target range using the estimated value without extending scheduled treatment time.

Using an example of performing, as ladle refining treatment, RH degassing treatment on molten steel and casting the RH degassing treated molten steel, accurate estimation of the molten steel temperature after the RH degassing treatment and control of the RH degassing treatment using the estimated value will be described in detail below in this order.

In the present disclosure, continuous temperature measurement is performed on the molten steel to accurately grasp the temperature changes during the RH degassing treatment. Examples of a temperature sensor that can be used for the continuous temperature measurement include a refractory-coated thermocouple and a radiation thermometer connected to optical fibers. The temperature measurement position is not limited as long as the position is the same throughout each operation, but the temperature sensor is desirably immersed at the surface of the molten steel in the ladle outside the vacuum vessel from the viewpoint of the ease of installation of the temperature sensor and the tolerance of the temperature sensor to heat and molten steel flow.

In the case of using a refractory-coated thermocouple as the temperature sensor, at or after the start of the RH degassing treatment, the probe for continuous temperature measurement (the part of the refractory-coated thermocouple to be immersed in molten steel) is immersed in the surface layer of the molten steel in the ladle to start temperature measurement, and the temperature measurement is continued until the end of the RH degassing treatment. In the present disclosure, the molten steel temperature in an initial stage of the RH degassing treatment is not necessarily required. However, since it takes several minutes before the coating refractory reaches the molten steel temperature and the temperature measured value enters a steady state, the immersion of the thermocouple in the molten steel is desirably performed from the initial stage of the treatment within the range in which the tolerance of the coating refractory is satisfied.

The immersion depth of the probe for continuous temperature measurement is not limited as long as the tip of the thermocouple within the range of the refractory coating is reliably immersed in the molten steel. However, since the molten steel in the ladle releases heat from its surface, a temperature distribution occurs in the surface layer, and typically the temperature measured value is higher when the immersion depth is deeper. Accordingly, it is preferable to correct the measured value of the molten steel temperature by the probe for continuous temperature measurement depending on the immersion depth of the probe for continuous temperature measurement.

The correction may be performed, for example, by a method by which a temperature offset value per unit depth of the difference between a reference immersion depth and an actual immersion depth is calculated beforehand and the offset value corresponding to the actual immersion depth at the time of measuring is uniformly added to or uniformly subtracted from the measured value to correct the measured value. The method of calculating the temperature offset value per unit depth of the difference between the reference immersion depth and the actual immersion depth is not limited, and, for example, the following method may be used.

Figure 1:
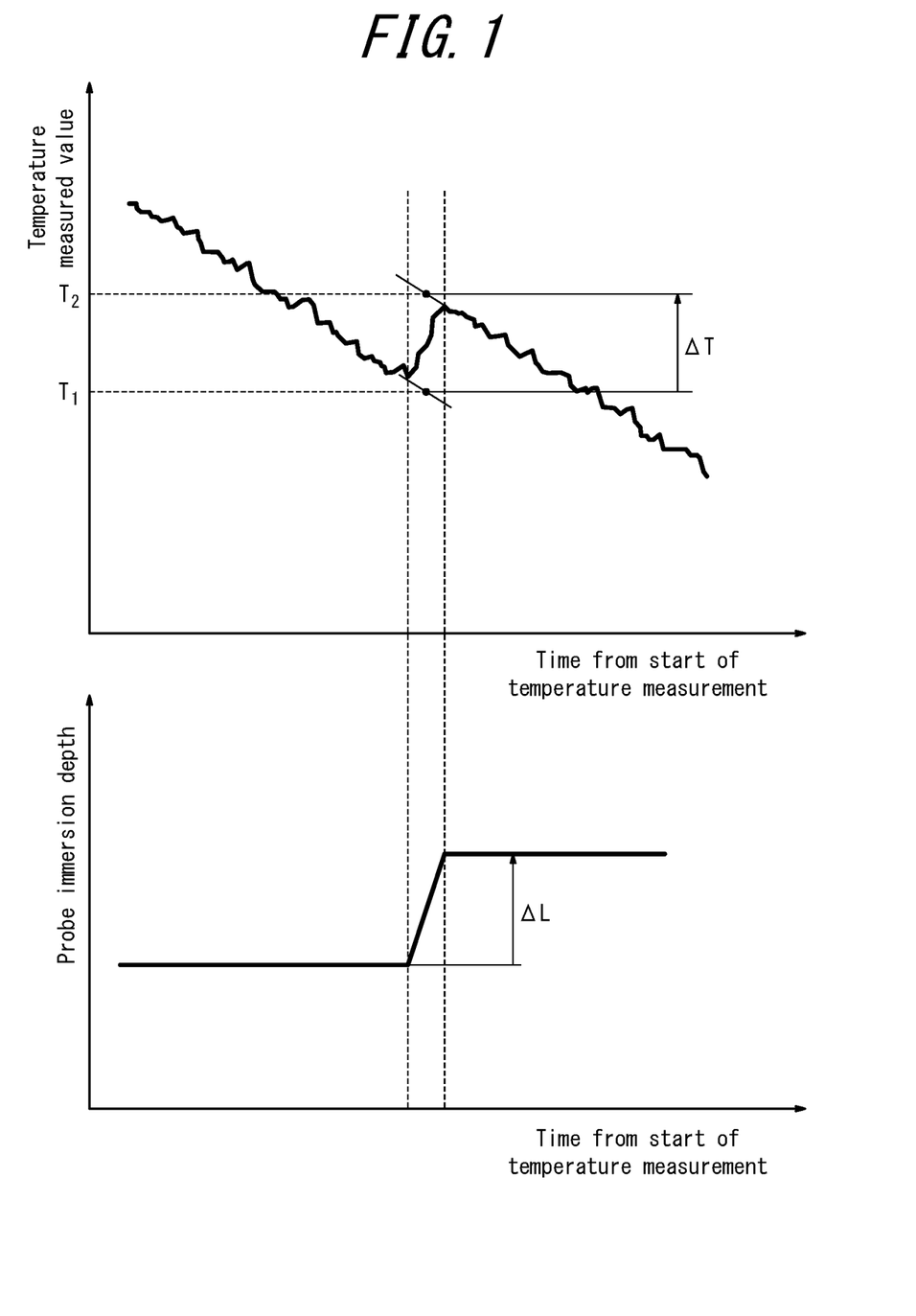
FIG. 1 is a diagram illustrating how to calculate a temperature offset value per unit depth of the difference between a reference immersion depth and an actual immersion depth of a probe for continuous temperature measurement.

As illustrated in FIG. 1, during a one-heat treatment period, continuous temperature measurement is performed for a certain period with the immersion depth of the probe being fixed, and then the immersion depth of the probe is changed to be deeper (ΔL in FIG. 1) and continuous temperature measurement is performed for a certain period with the changed immersion depth of the probe. Here, with the temperature change rates (the temperature change amounts per unit time) before and after the change of the probe immersion depth, the measured values are subjected to forward extrapolation and backward extrapolation to estimate the values ($T_1$ and $T_2$ in FIG. 1) at the timings during the change of the probe immersion depth. The temperature change amount ($\Delta T = T_2 - T_1$) between before and after the change of the probe immersion depth estimated in this way is divided by the change amount (ΔL) of the probe immersion depth and taken to be the temperature offset value (ΔT/ΔL) per unit depth of the difference between the reference immersion depth and the actual immersion depth.

While continuously measuring the molten steel temperature from the start to the end of the RH degassing treatment of the molten steel, the molten steel temperature after the RH degassing treatment is estimated on the basis of the change with time of the molten steel temperature in the continuous measured data of the molten steel temperature from the start of the RH degassing treatment to a determination timing that is earlier than the scheduled ending time of the treatment and at which whether adjustment operation of heating or cooling (hereafter also simply referred to as "adjustment operation") is necessary in the treatment is determined.

In detail, when performing the RH degassing treatment, for example an operator sets the timing of determining whether the adjustment operation is necessary. For example, the operator sets the determination timing to be 5 minutes before the scheduled ending time. This timing is desirably such a timing with which the operator, having recognized (obtained) the estimated value of the molten steel temperature at the scheduled ending time, can take an action of heating or cooling the molten steel so that a temperature increase or a temperature decrease of the molten steel will be completed by the scheduled ending time. The determination timing is preferably 3 minutes to 8 minutes before the scheduled ending time. If the determination timing is later than 3 minutes before the scheduled ending time, the time of estimating the molten steel temperature at the scheduled ending time is late. In such a case, if the estimated value of the molten steel temperature is not within the target range and an action of heating or cooling the molten steel is necessary, there is a possibility that the degassing treatment is not completed by the scheduled ending time and the treatment time is extended. If the determination timing is earlier than 8 minutes before the scheduled ending time, the time of estimating the molten steel temperature at the scheduled ending time is excessively early. In such a case, the estimation accuracy of the molten steel temperature at the scheduled ending time is likely to decrease.

Herein, the scheduled ending time denotes the time at which the RH degassing treatment needs to be ended in order to complete the next casting process according to the production schedule. The scheduled ending time is specifically determined on the basis of the requests from the casting process to the RH degassing treatment process. It is because if the ending time of the RH degassing treatment is later than the scheduled ending time, operational changes such as delaying the casting start time in the casting process and, in the case of sequential continuous casting (casting multiple heats continuously without interrupting casting), lowering the casting rate and waiting for the arrival of the molten steel after the RH degassing treatment are necessary, which causes a decrease in productivity. Alternatively, if the ending time of the RH degassing treatment is earlier than the scheduled ending time, the molten steel after the RH degassing treatment needs to wait for the start of the casting in a state of being held in the ladle. During this, the temperature of the molten steel in the ladle decreases, as a result of which the degree of superheat of the molten steel necessary for the casting may be unable to be ensured. In the worst case, the casting is forced to stop before the whole molten steel in the ladle is cast.

When the RH degassing treatment progresses and the preset determination timing is reached, the molten steel temperature at the scheduled ending time is estimated on the basis of the change with time of the molten steel temperature in the continuous measured data of the molten steel temperature at the time. For example, the molten steel temperature at the scheduled ending time can be estimated by the following method.

First, the molten steel temperatures at 1 minute before the determination timing and at the determination timing are read from the continuous measured data of the molten steel temperature, and the amount of change in the molten steel temperature per 1 minute is calculated from the difference between these temperatures. The molten steel temperature at the scheduled ending time is calculated by extrapolation on the assumption that the calculated amount of change in the molten steel temperature per 1 minute is unchanged until the scheduled ending time. Although this calculation can be performed by the operator, the continuous temperature measured values may be fed into a process computer or the like to perform the calculation automatically.

The estimation of the molten steel temperature at the scheduled ending time is not limited to the foregoing method, and may be performed according to the following Formula (1). The use of Formula (1) is more preferable because the estimation accuracy is improved.

$$T_f = BMA_{td} + (BMA_{td} - BMA_{td-\alpha})/\alpha \times t_r \quad (1)$$

where $T_f$ is the estimated temperature (° C.) of the molten steel at the scheduled treatment ending time, $BMA_{td}$ is the backward moving average value (° C.) of the continuous temperature measured value at time $t_d$, $BMA_{td-\alpha}$ is the backward moving average value (° C.) of the continuous temperature measured value at time ($t_d - \alpha$), $t_d$ is the operation time (minutes) from the start of the continuous measurement of the molten steel temperature to the determination timing, $t_d - \alpha$ is the operation time (minutes) from the start of the continuous measurement of the molten steel temperature to a minutes before $t_d$, and $t_r$ is the time (minutes) from the obtainment of the estimated value of the molten steel temperature at the scheduled ending time to the scheduled ending time.

By using Formula (1), the molten steel temperature can be estimated on the basis of the following (A) and (B):

(A) As the change with time of the continuous measured value of the molten steel temperature at the determination timing of determining whether the adjustment operation is necessary, the change with time of the molten steel temperature in the continuous temperature measured data from a minutes before the determination timing to the determination timing is used.

(B) As each of the respective representative values of the continuous temperature measured value at the determination timing and the continuous temperature measured value at α minutes before the determination timing, a backward moving average value for x minutes is used.

The molten steel temperature value in the continuous temperature measured data (hereafter referred to as "continuous temperature measured value") varies under the influence of noise and disturbances such as molten steel flow. Accordingly, when calculating the change with time of the molten steel temperature at a given timing, an accurate value may not be obtained if the calculation is performed on the basis of a displacement for a very short time. It is therefore desirable to calculate the change with time of the molten steel temperature for a period of a minutes. α is preferably 0.5 minutes to 2.0 minutes. If α is less than 0.5 minutes, the variation of the continuous temperature measured value cannot be absorbed. If α is more than 2.0 minutes, there is a possibility that the influence of a previously performed operation action such as ferroalloy charge remains and the behavior of the molten steel temperature is unstable.

If the instantaneous values of the respective timings are used as the representative value of the molten steel temperature at the determination timing and the representative value of the molten steel temperature at a minutes before the determination timing, an accurate value may not be obtained. To avoid this, it is desirable to use a backward moving average value for x minutes as the representative value of the molten steel temperature at each timing. In this way, the influence by, for example, cyclic variation in measured value due to noise and the like can be minimized.

Regarding the interval x of the moving average, it is desirable to perform continuous measurement of the molten steel temperature beforehand and, on the basis of whether the measured value has cyclic variation and the cycle in the case where the measured value has cyclic variation, determine the interval x to be a period of at least one cycle. The moving average interval may be a period greater than or equal to the molten steel circulation time (the time for the molten steel in the ladle to pass through the inside of the vacuum degassing vessel and return the ladle). If the moving average interval is excessively long, however, the moving average interval may include a period during which such an operation that causes an unsteady change in the molten steel temperature, such as ferroalloy addition or oxygen supply, is performed. This is likely to cause a decrease in the estimation accuracy of the estimated value of the molten steel temperature at the end of the treatment. It is therefore preferable to set the moving average interval so that the moving average can be calculated using the continuous temperature measured data in the period of killing treatment.

Once the estimated value of the molten steel temperature at the scheduled ending time (hereafter also simply referred to as "estimated value") has been obtained in the above-described manner, the operator determines the next action to be taken depending on whether the estimated value is within the predetermined target temperature range.

In detail, if the estimated value is higher than the predetermined target temperature range, an operation of decreasing the molten steel temperature is performed during the period from the determination timing to the scheduled ending time. An example of the operation of decreasing the molten steel temperature in the RH degassing treatment is a method of charging iron scrap whose particle size has been adjusted into the molten steel and melting the iron scrap to decrease the molten steel temperature using sensible heat and latent heat of the iron scrap.

If the estimated value of the molten steel temperature at the scheduled ending time is lower than the predetermined target temperature range, an operation of increasing the molten steel temperature is performed during the period from the determination timing to the scheduled ending time. An example of the operation of increasing the molten steel temperature is a method of adding metal Al to the molten steel and also supplying oxygen gas to the molten steel to increase the molten steel temperature using heat of combustion of Al by oxygen gas. Metal Si or ferrosilicon may be used instead of metal Al depending on the steel type. In the case where the vacuum degassing vessel is equipped with a burner capable of molten steel heating in the RH degassing equipment, the burner may be used to heat the molten steel as long as the cleanliness of the molten steel is not impaired.

If the estimated value of the molten steel temperature at the scheduled ending time is within the predetermined target temperature range, the current operation is continued from the determination timing to the scheduled ending time without performing any of the foregoing operation of decreasing the molten steel temperature and the foregoing operation of increasing the molten steel temperature.

The predetermined target temperature range is a molten steel temperature range designated from the next casting process. Typically, in the casting process, operation is performed while setting an appropriate casting temperature range (range of degree of superheat of molten steel) depending on the steel type so that the solidification of the cast steel can be completed throughout its thickness before it reaches the end of the continuous caster without defects such as cracking of the cast steel or troubles such as breakout or casting stop. The casting process accordingly designates the target temperature range at the end of the RH degassing treatment in consideration of an estimated time to the casting start so that the degree of superheat of the molten steel in the casting stage (i.e. at the scheduled casting time) will be within the appropriate casting temperature range. The range of the target value is usually within ±3° C., although this depends on the steel type and the operation situation. If the temperature at the end of the RH degassing treatment is higher than the target range, the operation conditions in the casting process are changed by delaying the casting start time, lowering the casting rate, or the like so that operation can be performed without breakout and the like even when the molten steel temperature is high. This causes a decrease in productivity. If the temperature at the end of the RH degassing treatment is lower than the target range, the degree of superheat of the molten steel necessary for the casting may be unable to be ensured. In the worst case, the casting is forced to stop before the whole molten steel in the ladle is cast.

As the number of uses of the probe for continuous temperature measurement increases, the site (slag line) in the refractory-coated part that comes into contact with slag upon immersion erodes locally. If the refractory coating of the slag line site erodes and the inside of the probe is affected as a result, the thermocouple inside is broken. Thus, to improve the life of the probe for continuous temperature measurement, it is important to improve the life of the refractory coating of the slag line site. Although a method of increasing the thickness of the refractory coating or a method of changing the refractory material to be more erosion resistant may be used, these methods may cause an increase in the costs of the probe for continuous temperature measurement or an increase in the risk of thermal spalling.

Figure 2:
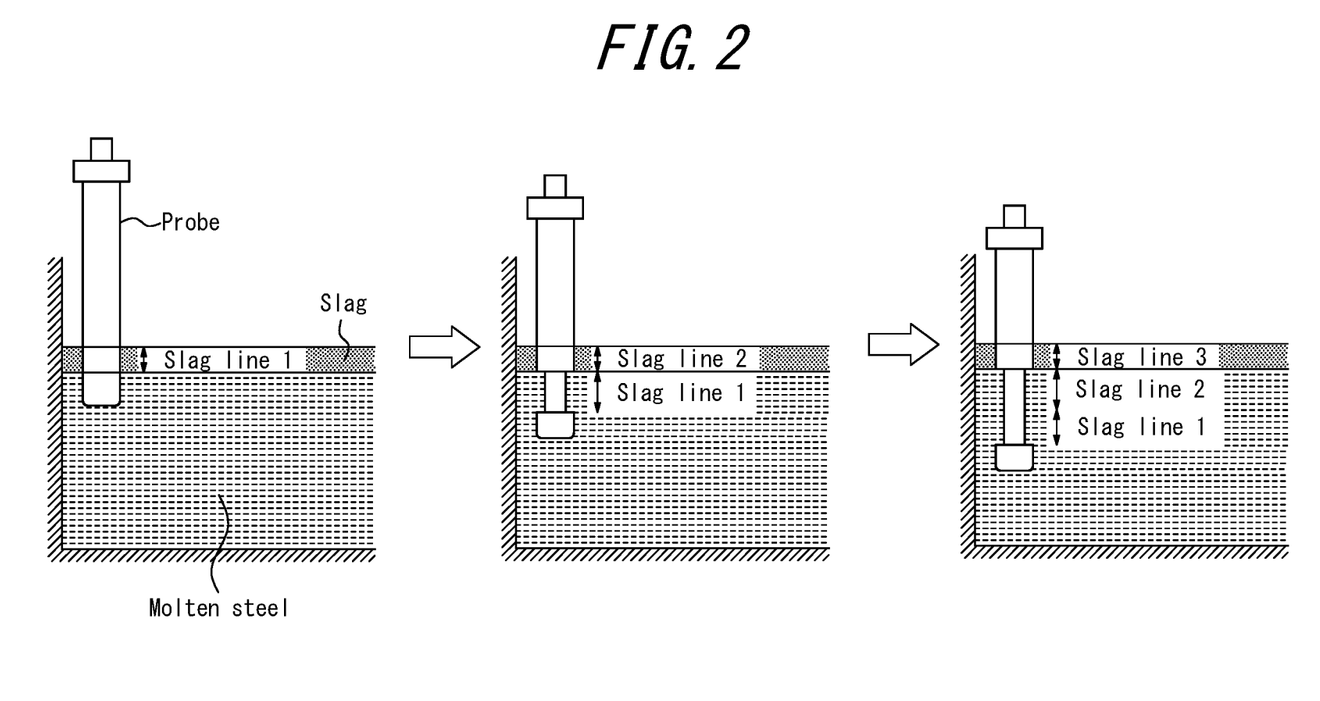
FIG. 2 is a diagram illustrating a method of regulating the immersion depth of the probe for continuous temperature measurement.

In the operation method of RH degassing treatment according to the present disclosure, the following method of increasing the immersion depth of the probe for continuous temperature measurement with an increase of the number of uses of the probe can be used: As illustrated in FIG. 2, for example, upon the start of use of a new probe for continuous temperature measurement, the probe for continuous temperature measurement is immersed shallow so that the immersion depth of the refractory-coated part is at a minimum level without hindering the measurement of the molten steel temperature. The immersion depth of the probe for continuous temperature measurement is increased as the number of uses increases as indicated by the arrows in FIG. 2. By such distributed use of the site corresponding to the slag line in the refractory-coated part of the probe for continuous temperature measurement, local erosion of the refractory coating can be prevented and the life of the probe for continuous temperature measurement can be improved. We confirmed that the probe life was improved by approximately 10 charges to 20 charges in the case of using this method as compared with the case of not using this method. In the case of increasing the immersion depth of the probe for continuous temperature measurement with an increase of the number of uses of the probe, it is preferable to correct the measured value of the molten steel temperature by the probe depending on the immersion depth of the probe.

EXAMPLES

First Example 300 tons to 340 tons of a molten steel decarburized in a converter was received in a ladle and subjected to RH degassing treatment using a RH degassing device. During the treatment, a continuous temperature measurement device was immersed in the molten steel, and the molten steel temperature was estimated on the basis of the measured temperature data. The molten steel temperature was observed every second by continuous temperature measurement. The estimation of the molten steel temperature was performed according to the following Formula (1). The estimated molten steel temperature is shown in Table 1.

$$T_f = BMA_{t_d} + (BMA_{t_d} - BMA_{t_d - \alpha})/\alpha \times t_r \qquad (1)$$

where $T_f$ is the estimated temperature (° C.) of the molten steel at the scheduled treatment ending time, $BMA_{t_d}$ is the backward moving average value (° C.) of the continuous temperature measured value at time $t_d$, $BMA_{t_d - \alpha}$ is the backward moving average value (° C.) of the continuous temperature measured value at time $(t_d - \alpha)$, $t_d$ is the operation time (minutes) from the start of the continuous measurement of the molten steel temperature to the determination timing, $t_d - \alpha$ is the operation time (minutes) from the start of the continuous measurement of the molten steel temperature to a minutes before $t_d$, and $t_r$ is the time (minutes) from the obtainment of the estimated value of the molten steel temperature at the scheduled ending time to the scheduled ending time.

In the foregoing operation, the molten steel temperature at the end of the treatment was estimated where $t_d$ in Formula (1) was a value corresponding to 5 minutes before the scheduled treatment ending time, α was 1 minute, and x was 0 minutes or 2 minutes in each Example. In the case of setting x to 0 minutes, moving average was not taken.

Table 1 shows the results of estimating, during continuous temperature measurement in RH degassing treatment, the temperature after the treatment according to the present disclosure. As shown in Table 1, in each of Examples 1 to 3, the estimated value at 5 minutes before the end of the treatment was within the target temperature range of the target value ±2° C., so that adjustment by heating or cooling was not performed. The actual molten steel temperature at the end of actual RH degassing treatment was equally within the range of the target value ±2° C., demonstrating that the estimation formula and the determination of whether to perform adjustment were correct.

Figure 3:
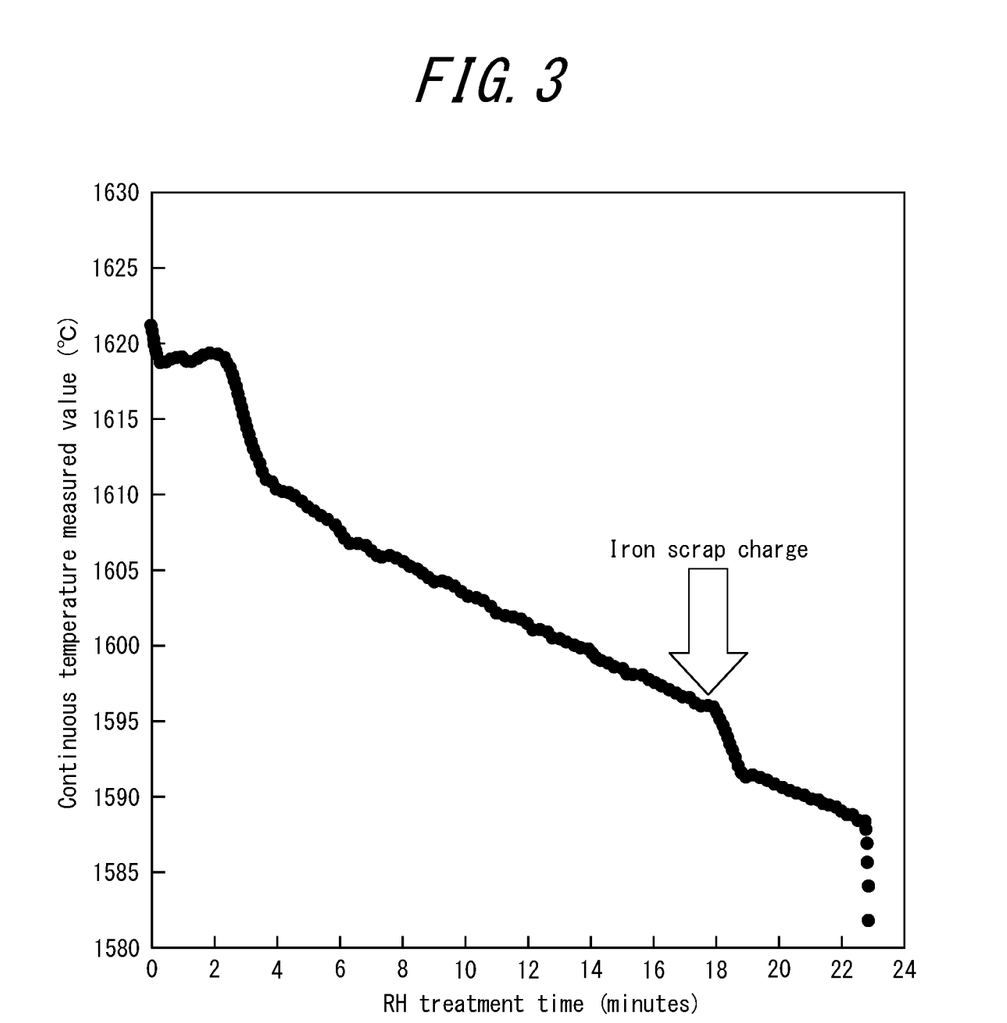
FIG. 3 is a diagram illustrating an operation example of performing a temperature decrease operation of charging iron scrap.
Figure 4:
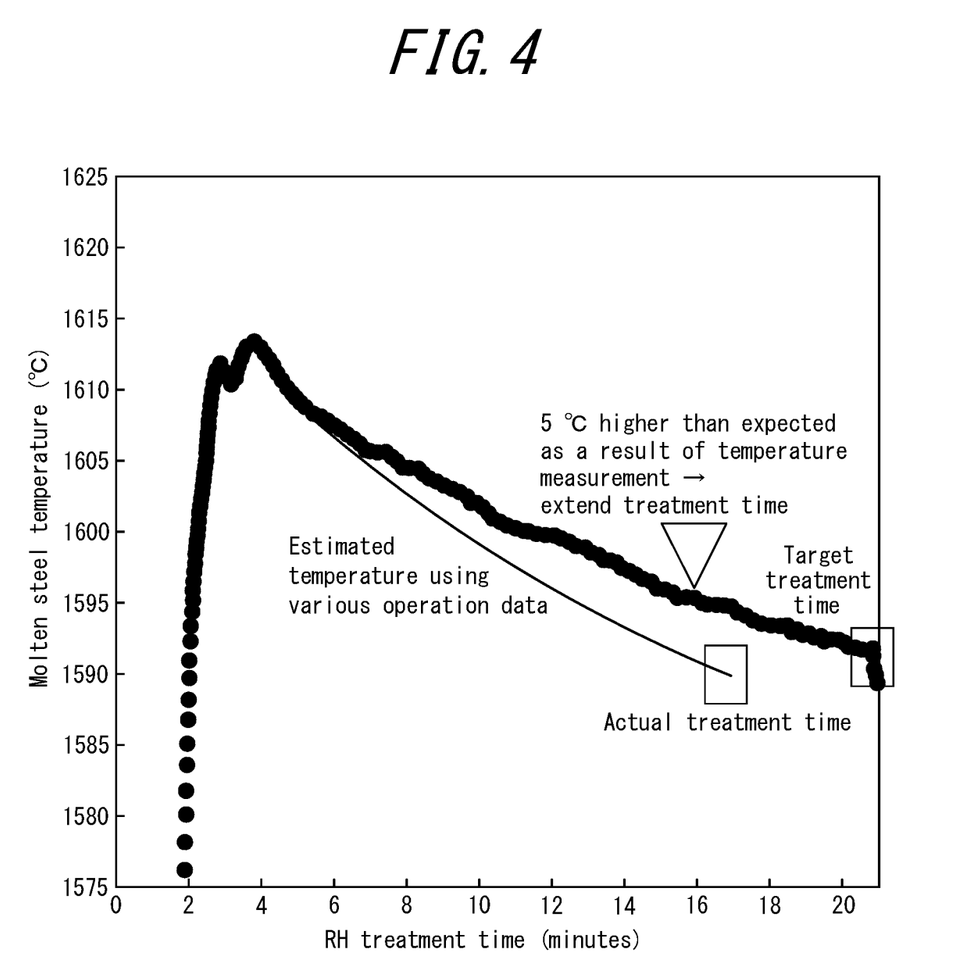
FIG. 4 is a diagram illustrating an operation example of estimating the molten steel temperature at the end of RH degassing treatment by batch temperature measurement.

In each of Examples 4 and 5, the estimated value at 5 minutes before the end of the treatment was outside the target temperature range of the target value ±2° C. Accordingly, a temperature decrease operation of charging iron scrap was performed in Example 4 (see FIG. 3), and a temperature increase operation of charging Al and blowing oxygen was performed in Example 5. Consequently, the actual molten steel temperature at the end of actual RH degassing treatment was within the range of the target value ±2° C.

For comparison, the molten steel temperature at the end of the RH degassing treatment was estimated by noncontinuous temperature measurement (batch temperature measurement) instead of continuous temperature measurement. Specifically, batch temperature measurement was performed at 5 minutes before the end of the treatment, and the obtained measured value was substituted into an estimation formula on the basis of various operation data (such as the time from the preceding process to the RH treatment and the ladle temperature) to calculate the estimated value of the molten steel temperature at the end of the RH degassing treatment. The calculation result was 1590° C. Since 1590° C. was within the range of the target value ±2° C., the operation was continued to end the treatment as scheduled without performing an operation of increasing or decreasing the molten steel temperature. However, when batch temperature measurement was performed again 1 minute before the target treatment ending time, the temperature was 5° C. higher than expected. Hence, the treatment time was extended by 3 minutes to cool the molten steel and meet the target temperature of 1589° C.

TABLE 1

| | Temperature after RH treatment (° C.) | | |
|---|---|---|---|
| Example | Target temperature | Estimated value at 5 minutes before end of treatment (x = 2) | Actual value |
| 1 | 1573 | 1572.3 | 1574.9 |
| 2 | 1580 | 1578.6 | 1579.6 |
| 3 | 1572 | 1573.8 | 1573.0 |
| 4 | 1607 | 1613.5 | 1605.5 |
| 5 | 1594 | 1590.6 | 1593.7 |

Figure 5:
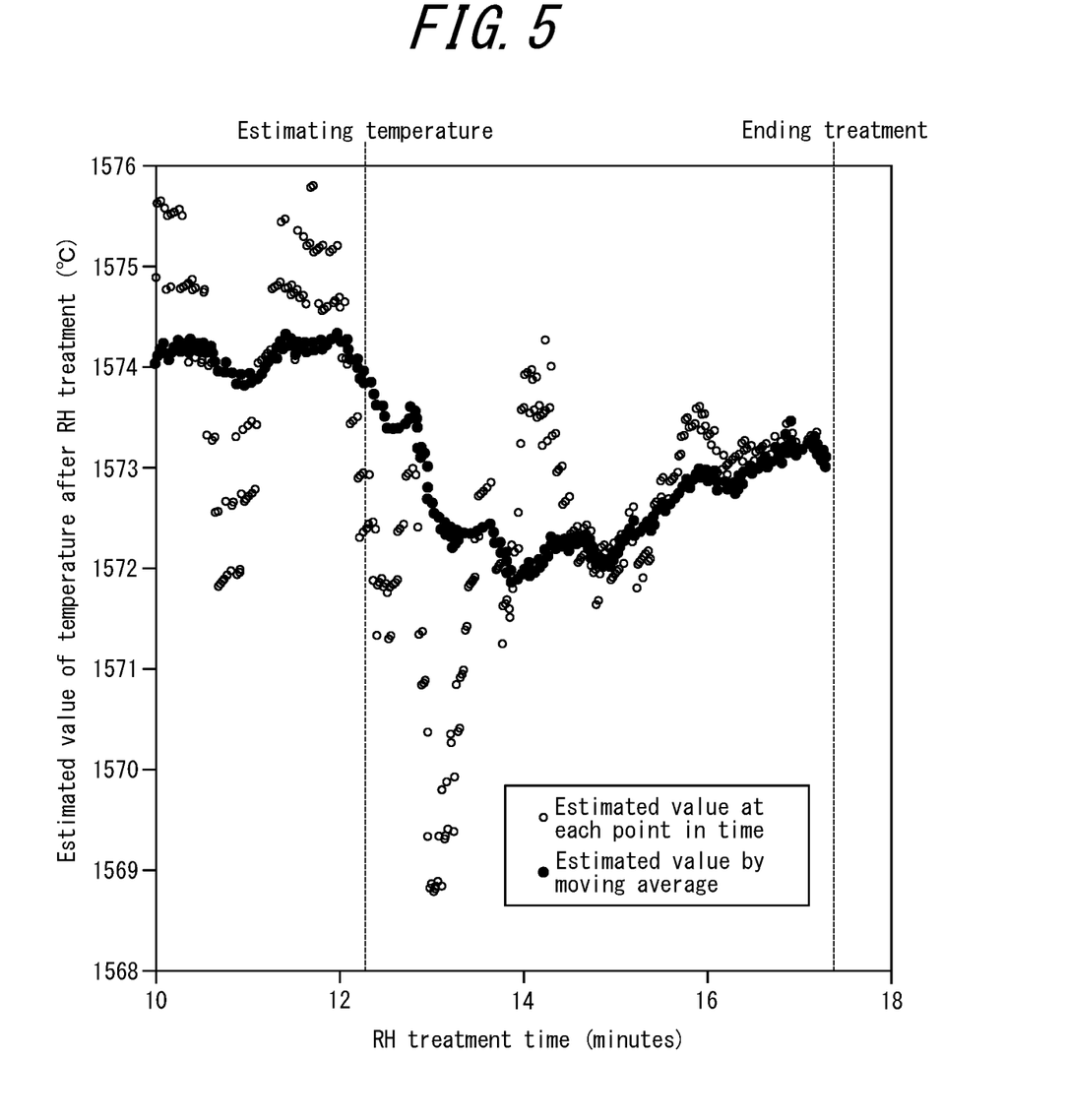
FIG. 5 is a diagram illustrating the trend estimated values of the temperature after RH treatment in an operation according to the present disclosure.

FIG. 5 illustrates the trend estimated values of the temperature after the RH treatment in an operation according to the following procedure (a) to (f):
  (a) At the start of the operation, the scheduled treatment time was 17.5 minutes.
  (b) The operation was started with the determination timing being set to 12.5 minutes after the operation start and a being set to 1 minute. Continuous temperature measurement was started at the same time.
  (c) Since the operation progressed as scheduled, a backward moving average value 11.5 minutes after the operation start and a backward moving average value 12.5 minutes after the operation start with a moving average interval of 2 minutes were calculated when 12.5 minutes had elapsed from the operation start.

(d) Using these backward moving average values, the estimated value of the molten steel temperature 17.5 minutes after the operation start was calculated according to Formula (1).
(e) The estimated value calculated in (d) was 1573.8° C., which was within the range of the target value (1572.0° C.)±2° C. Hence, the operation was ended at 17.5 minutes.
(f) The actual molten steel temperature at the end of the operation was 1573.0° C., demonstrating that the estimated value by continuous measurement was highly accurate.

In FIG. 5, the gray plots indicate estimated values when x=0, and the black plots indicate estimated values when x=2. The gray plots obtained without moving average varied with cycles of approximately 2 minutes. The black plots obtained by taking moving average with a width of 2 minutes did not have such variation, demonstrating that the temperature was able to be estimated accurately.

The presently disclosed techniques are not limited to RH degassing treatment described above, and are also applicable to, for example, gas bubbling treatment. Specifically, for steel types that are subjected to gas bubbling treatment and subsequent casting after tapped from a converter, continuous temperature measurement is performed during the gas bubbling treatment, and the molten steel temperature at the end of the gas bubbling treatment is estimated using Formula (1) as in the first example.

Since there is no heating means in gas bubbling treatment, casting is impossible if the molten steel temperature is below the target lower limit. In view of this, conventionally, the tapping temperature is set higher, and cold material is charged during gas bubbling treatment to adjust the temperature after the gas bubbling treatment to the target temperature. However, given that the amount of the cold material charged is determined on the basis of an empirically predicted temperature decrease amount, if the temperature decrease amount is smaller than expected, the treatment time is extended to cool the molten steel in some cases.

Suppose the presently disclosed techniques are applied to gas bubbling treatment in which Ar gas of 400 L/min is blown into molten steel with a heat size of 340 t and that has a scheduled treatment time of 10 minutes. For example, when the molten steel temperature at the end of the treatment is estimated where $t_d$ in Formula (1) is a value corresponding to 3 minutes before the scheduled treatment ending time, a is 1 minute, and x is 2 minutes, an accurate estimated value is obtained as in the first example. Thus, an appropriate amount of cold material can be charged in gas bubbling treatment without concern about excessively lowering the molten steel temperature, reducing the need to extend the treatment time to cool the molten steel.

Second Example 300 tons to 340 tons of molten steel decarburized in a converter was received in a ladle and subjected to RH degassing treatment using a RH degassing device. During the treatment, a continuous temperature measurement device was immersed in the molten steel, and the molten steel temperature was estimated on the basis of the measured temperature data. Continuous temperature measurement by a probe for continuous temperature measurement was performed at an immersion depth 300 mm deeper than the immersion depth in the first example. It was confirmed beforehand that the temperature offset value as a result of the immersion depth of the probe for continuous temperature measurement being 300 mm deeper than in the first example was 1.1° C. The other operation conditions and continuous temperature measurement conditions were the same as in the first example.

Table 2 shows the results of estimating, during continuous temperature measurement in RH degassing treatment, the temperature after the treatment according to the present disclosure. As shown in Table 2, in each of Examples 6 to 8, 1.1° C. which is the temperature offset value as a result of the immersion depth being 300 mm deeper was subtracted from the estimated value at 5 minutes before the end of the treatment to correct the estimated value. The corrected estimated value was within the target temperature range of the target value ±2° C., so that adjustment by heating or cooling was not performed. The actual molten steel temperature at the end of actual RH degassing treatment was equally within the range of the target value ±2° C., demonstrating that the estimation formula, the value correction, and the determination of whether to perform adjustment were correct.

TABLE 2

| | Probe immersion conditions | | | Temperature after RH treatment (° C.) | | |
| --- | --- | --- | --- | --- | --- | --- |
| Example | Increment from reference immersion depth (mm) | Temperature offset value (° C.) | Target temperature | Estimated value at 5 minutes before end of treatment (x = 2) without offset | Estimated value at 5 minutes before end of treatment (x = 2) with offset | Actual value |
| 6 | 300 | 1.1 | 1588 | 1590.1 | 1589.0 | 1589.3 |
| 7 | 300 | 1.1 | 1599 | 1600.6 | 1599.5 | 1599.0 |
| 8 | 300 | 1.1 | 1592 | 1594.2 | 1593.1 | 1592.4 |

The invention claimed is:

1. An operation method of a ladle refining treatment by which the ladle refining treatment of a molten steel is performed while continuously measuring a molten steel temperature during operation of the ladle refining treatment of the molten steel, the operation method comprising
setting a time earlier than a scheduled ending time of the ladle refining treatment in a continuous measurement period of the molten steel temperature as a determination timing, and estimating the molten steel temperature at the scheduled ending time on the basis of a change with time of the molten steel temperature in continuous measured data of the molten steel temperature from a start of continuous measurement of the molten steel temperature to the determination timing,
an estimated value $T_f$ of the molten steel temperature is calculated according to the following Formula (1):

$$T_f = BMA_{td} + (BMA_{td} - BMA_{td-\alpha})/\alpha \times t_r \quad (1)$$

where $T_f$ is the estimated value in ° C. of the molten steel temperature at the scheduled ending time, $BMA_{td}$ is a backward moving average value in ° C. of a continuous temperature measured value at time $t_d$, $BMA_{td-\alpha}$ is a backward moving average value in ° C. of a continuous temperature measured value at time $(t_d-\alpha)$, $t_d$ is an operation time in minutes from the start of the continuous measurement of the molten steel temperature to the determination timing, $t_d-\alpha$ is an operation time in minutes from the start of the continuous measurement of the molten steel temperature to a minutes before $t_d$, and $t_r$ is a time in minutes from an obtainment time of the estimated value to the scheduled ending time.

2. The operation method of a ladle refining treatment according to claim 1, wherein the continuous measured data of the molten steel temperature is of measured values corrected depending on an immersion depth of a temperature sensor for continuous temperature measurement.

3. The operation method of a ladle refining treatment according to claim 2, wherein the immersion depth of the temperature sensor for continuous temperature measurement is increased with an increase of the number of uses of a measuring element of the temperature sensor for continuous temperature measurement.

4. The operation method of a ladle refining treatment according to claim 1, wherein in a case where an estimated value of the molten steel temperature is within a target range of the molten steel temperature at the scheduled ending time, operation conditions at the determination timing are maintained until the scheduled ending time,
wherein in a case where an estimated value of the molten steel temperature is higher than a target range of the molten steel temperature at the scheduled ending time, an operation of decreasing the molten steel temperature is performed in a period from the determination timing to the scheduled ending time, or
wherein in a case where an estimated value of the molten steel temperature is lower than a target range of the molten steel temperature at the scheduled ending time, an operation of increasing the molten steel temperature is performed in a period from the determination timing to the scheduled ending time.

5. The operation method of a ladle refining treatment according to claim 1, wherein the determination timing is 3 minutes to 8 minutes before the scheduled ending time.

6. The operation method of a ladle refining treatment according to claim 1, wherein $\alpha$ is 0.5 minutes to 2.0 minutes.

7. The operation method of a ladle refining treatment according to claim 1, wherein a range of backward moving average is determined on the basis of a variation cycle of a continuous measured value of the molten steel temperature measured beforehand.

8. The operation method of a ladle refining treatment according to claim 1, wherein the molten steel temperature at the scheduled ending time is estimated on the basis of the change with time of the molten steel temperature in the continuous measured data of the molten steel temperature during killing treatment from after end of at least one of alloying addition and oxygen supply to the determination timing in the continuous measurement period of the molten steel temperature.

9. The operation method of a ladle refining treatment according to claim 1, wherein the ladle refining treatment is RH degassing treatment.

* * * * *